(12) United States Patent
Roberge et al.

(10) Patent No.: US 8,991,308 B2
(45) Date of Patent: Mar. 31, 2015

(54) DUAL-PIVOTED QUICK BALE EJECTOR FOR ROUND BALER

(75) Inventors: Martin J. Roberge, Saskatoon (CA); Chance Peutert, Assiniboia (CA); Evan Brinkman, Saskatoon (CA)

(73) Assignee: CNH Industrial Canada, Ltd., Saskatchewan (CA)

( * ) Notice: Subject to any disclaimer, the term of this patent is extended or adjusted under 35 U.S.C. 154(b) by 502 days.

(21) Appl. No.: 13/308,304

(22) Filed: Nov. 30, 2011

(65) Prior Publication Data

US 2013/0133530 A1 May 30, 2013

(51) Int. Cl.
*A01F 15/07* (2006.01)
*A01F 15/08* (2006.01)

(52) U.S. Cl.
CPC ....... *A01F 15/0883* (2013.01); *Y10T 29/49448* (2015.01)
USPC ...................... 100/88; 100/7; 100/87; 56/341

(58) Field of Classification Search
CPC ......................... A01F 15/0875; A01F 15/0883
USPC ................ 100/7, 87, 88, 188 R, 218; 56/341; 414/24.5, 24.6, 111, 546, 911
See application file for complete search history.

(56) References Cited

U.S. PATENT DOCUMENTS

| | | | |
|---|---|---|---|
| 1,874,345 A * | 8/1932 | Parrot | ............................ 472/118 |
| 4,172,354 A | 10/1979 | Vermeer et al. | |
| 4,258,619 A | 3/1981 | Gaeddert | |
| 4,393,764 A | 7/1983 | Viaud | |
| 4,433,619 A | 2/1984 | Anstey et al. | |
| 4,534,285 A | 8/1985 | Underhill | |
| 4,542,617 A | 9/1985 | Sonntag | |
| 4,667,592 A | 5/1987 | Pentith et al. | |
| 6,170,245 B1 | 1/2001 | Underhill | |
| 6,295,797 B1 | 10/2001 | Naaktgeboren et al. | |
| 6,622,468 B2 | 9/2003 | Lucand et al. | |
| 6,640,699 B2 | 11/2003 | Viaud | |
| 6,644,006 B1 | 11/2003 | Merritt et al. | |

(Continued)

FOREIGN PATENT DOCUMENTS

| | | |
|---|---|---|
| DE | 2626263 A1 | 12/1977 |
| DE | 3415310 | 10/1985 |
| NL | WO2011/053120 A1 * | 5/2011 .............. A01F 15/07 |

OTHER PUBLICATIONS

Anderson et al., United States Statutory Invention Registration No. H1,826, Published Jan. 4, 2000.

*Primary Examiner* — Jimmy T Nguyen
(74) *Attorney, Agent, or Firm* — Patrick M. Sheldrake; Seyed V. Sharifi T.

(57) ABSTRACT

The present invention relates to a baler ejection system that may be used with an agricultural harvester, such as a round baler, waste baler, combine, or cotton harvester. More particularly, the bale ejection system uses the motion of two pairs of parallel arms that extend transversely from the sidewalls of a bale chamber at two sets of distinct pivot points. When activated by the operator of the bale ejection system, the two pairs of parallel arms raise simultaneously to expose an outlet through which the bale may be ejected. The bale ejection system is designed to allow a larger outlet for the bale evacuation as compared to existing bale ejection systems that employ circular motion to expose the bale outlet. A formed bale may become ejected by one or more conveyer belts that exert a rearward force on the bale within the bale chamber.

18 Claims, 6 Drawing Sheets

(56) References Cited

U.S. PATENT DOCUMENTS

| | | |
|---|---|---|
| 6,688,092 B2 | 2/2004 | Anstey et al. |
| 6,745,680 B2 | 6/2004 | Viaud et al. |
| 7,055,425 B2 | 6/2006 | Viaud et al. |
| 7,114,435 B2 | 10/2006 | Viaud et al. |
| 7,140,294 B1 | 11/2006 | Anstey et al. |
| 7,162,951 B2 | 1/2007 | Viaud et al. |
| 7,165,491 B2 | 1/2007 | Viaud |
| 7,171,892 B2 | 2/2007 | Viaud |
| 7,380,496 B2 | 6/2008 | Viaud |
| 7,404,356 B2 | 7/2008 | Viaud |
| 7,568,425 B2 | 8/2009 | Viaud |
| 7,640,852 B1 | 1/2010 | Anstey et al. |
| 2002/0121200 A1* | 9/2002 | Viaud ............... 100/70 R |
| 2005/0045051 A1* | 3/2005 | Viaud et al. ........ 100/88 |
| 2011/0100236 A1* | 5/2011 | Viaud ............... 100/87 |

* cited by examiner

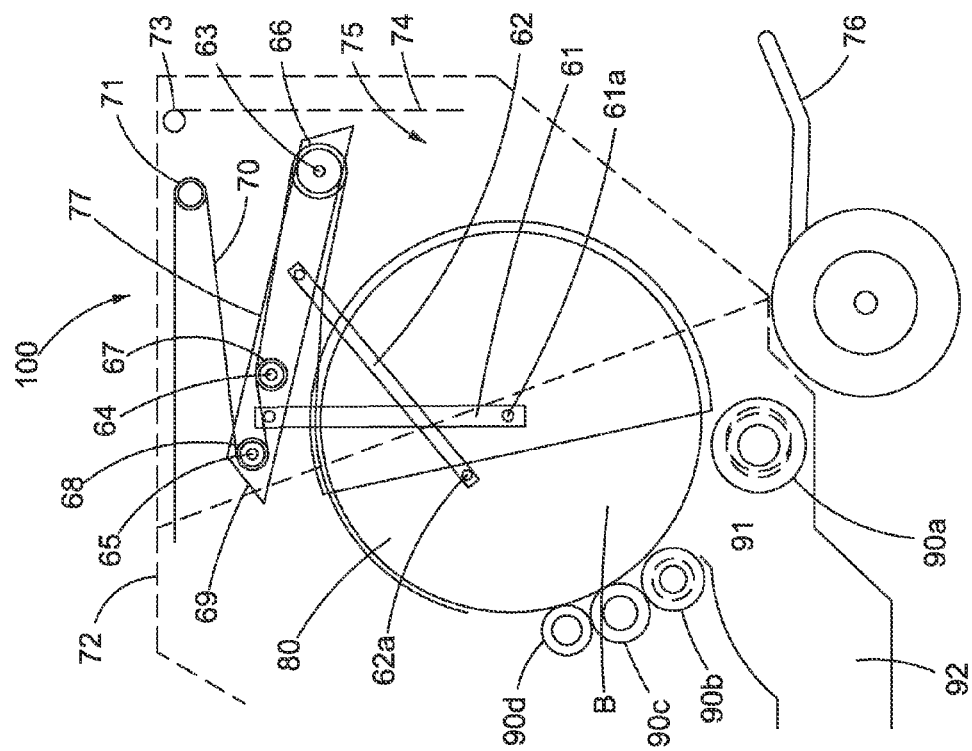
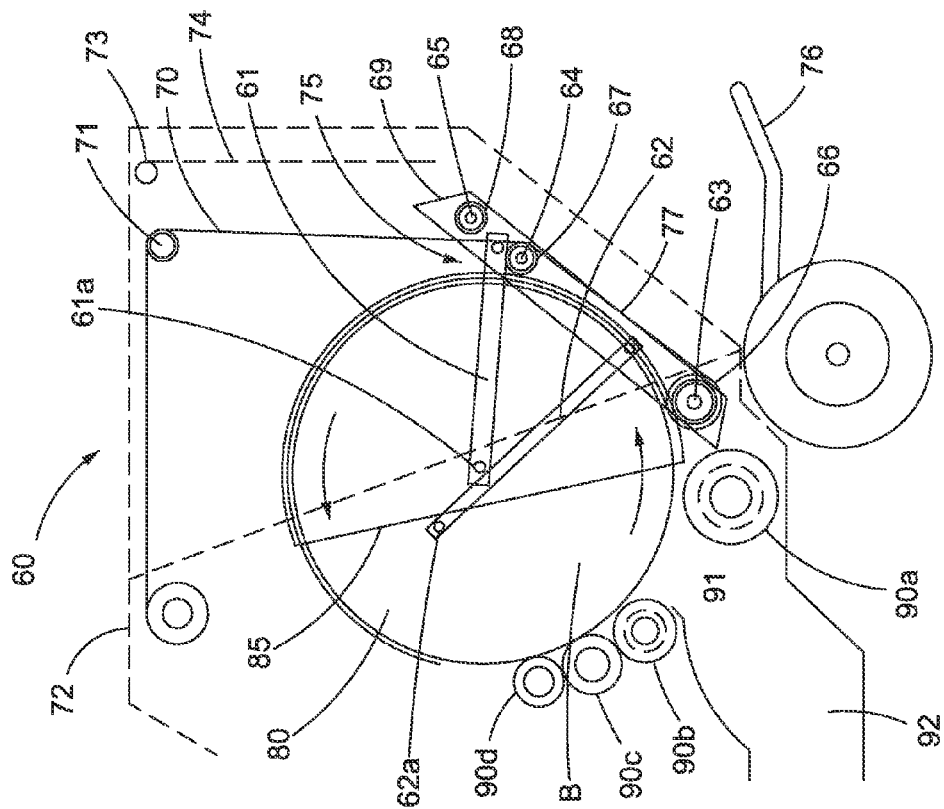

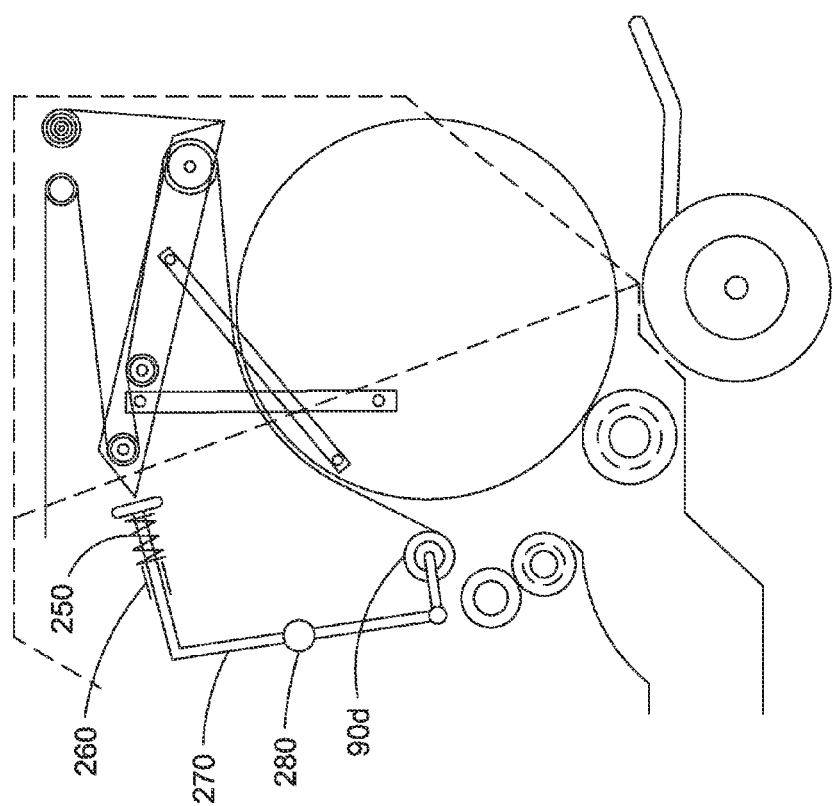

DUAL-PIVOTED QUICK BALE EJECTOR FOR ROUND BALER

TECHNOLOGY FIELD

The present invention relates to a mechanism and system for the quick ejection of a bale in an agricultural harvester, and more particularly, to a bale ejection system comprising at least two arms, the at least two arms having separate and distinct pivot positions relative to each other. The system allows for quick elevation of the arms and quick ejection of a bale when the bars are in a raised position relative to their starting position.

BACKGROUND

For many years agricultural balers have been used to consolidate and package crop material so as to facilitate the storage and handling of the crop material for later use. Usually, a mower-conditioner cuts and conditions the crop material for windrow drying in the sun. When the cut crop material is properly dried, a baler, for example a round baler, travels along the windrows to pick up the crop material and form the crop material into cylindrically-shaped round bales.

More specifically, the pickup of the baler gathers the cut and windrowed crop material from the ground then convey the cut crop material into a bale-forming chamber within the baler. A drive mechanism operates to activate the pickup, auger, and a rotor of the feed mechanism. A conventional baling chamber may consist of a pair of opposing sidewalls with a series of belts that rotate and compress the crop material into a cylindrical shape.

When the bale has achieved a desired size and density, a wrapping system may wrap the bale to ensure that the bale maintains its shape and density. For example, a net may be used to wrap the bale of crop material. A cutting or severing mechanism may be used to cut the net once the bale has been wrapped. The wrapped bale may be ejected from the baler and onto the ground by, for example, raising a tailgate of the baler. The tailgate is then closed and the cycle repeated as necessary and desired to manage the field of cut crop material.

The tailgate of the baler typically houses a simple door or panel that is affixed to the tailgate by hinges. In one position, the door or panel remains closed to prevent escape of the harvested bale. In another position, the door or panel can be placed in an open position to facilitate the exit of the harvested bale. Conventional balers require a relatively long period of time (e.g., a downtime), typically in the range of between 10 and 15 seconds, to open the door or panel during operation and evacuation of the bale. The downtime required to operate the door reduces the overall efficiency of the harvesting system and interrupts continuous harvesting. The simple door or panel mechanism typically operates very slowly in a manual or automatic fashion.

Once fully open, the weight of the door or panel is typically very heavy, which affects the center of gravity of the equipment, puts additive stress on the tension points, and may cause instability problems if the agricultural harvester is on a hill or slope.

The present invention addresses the above-identified shortcomings of the conventional balers and also includes a design that lowers the weight stress on a single axis or pivot point, thereby increasing the stability of the machine on a slope or hill or angled surface while the machine is in operation. The present invention facilitates maintenance of the agricultural harvester in more confined spaces by allowing access to the bale chamber and back of the agricultural harvester without having to accommodate a large swinging tailgate that is associated with most conventional systems. The present invention also allows for a wider outlet through which the bale may exit the bale chamber by, in some embodiments, pivoting a lowermost roll that supports the bale in the bale chamber in a closed position to a very high position. This high positioning of the lowermost roll attached to the bale carrier allows easy clearance of the bale through the outlet in both conventional and more modern agricultural harvesters, which may not use net wrapping for its fully formed bales. The present invention allows for a higher degree of safety in having the tailgate mechanism fold inward instead of being raised or lowered. There is a need to design a quick bale ejection system in which the system has at least two pivot points by which a baler carrier is opened in a more safe, timely, and efficient manner while also facilitating clearance of the fully formed bales of harvested material in a lateral vector.

SUMMARY OF THE INVENTION

Some embodiments of the present invention address and overcome one or more of the above shortcomings and drawbacks, by providing bale ejection system with increased efficiency and speed for smooth operation. The bale ejection system uses the motion of two pairs of parallel arms that extend transversely from the sidewalls of a bale chamber at two sets of distinct pivot points. When activated by the operator of the bale ejection system, the two pairs of arms attached to tension actuators and (stationary) sidewalls raise simultaneously to expose an outlet through which the bale may be ejected. In some embodiments, a netted bale becomes ejected by one or more conveyer belts or baling belts that exert a rearward force on the bale within the bale chamber. The bale becomes ejected through the outlet onto a field upon which the bale ejection system is operating.

In some embodiments, the invention relates to a bale ejection system comprising: a bale chamber comprising a first sidewall and a second sidewall; an outlet at the rear end of the bale chamber; and a bale carrier positioned over the outlet, the bale carrier movable among a closed position and one or more open positions, comprising: a first pair of arms extending transversely from and affixed to a first pair of pivot points on the first and second sidewalls; a second pair of arms extending transversely from and affixed to a second pair of pivot points on the first and second sidewalls; one or more fixed members; and a pair of bars affixed to the one or more fixed members. In some embodiments the pair of bars are aligned in a parallel fashion. In some embodiments, bale carrier has at least two fixed members, at least three fixed, or at least four fixed members.

In some embodiments, the invention relates to a bale ejection system comprising: a bale chamber comprising a first sidewall and a second sidewall; an outlet at the rear end of the bale chamber; and a bale carrier positioned over the outlet, the bale carrier movable among a closed position and one or more open positions, comprising: a first pair of arms extending transversely from and affixed to a first pair of pivot points on the first and second sidewalls; a second pair of arms extending transversely from and affixed to a second pair of pivot points on the first and second sidewalls; one or more fixed members positioned at a distance from the first and second pair of pivot points defined by the length of the first and second pair of arms; and a pair of bars affixed to the one or more fixed members. In some embodiments the pair of bars are aligned in a parallel fashion.

In some embodiments, the invention relates to a bale ejection system comprising: a bale chamber comprising a first sidewall and a second sidewall; an outlet at the rear end of the bale chamber; and a bale carrier obstructing the outlet, the bale carrier movable among a closed position and one or more open positions, comprising: a first pair of arms extending in parallel transversely from and affixed to a first pair of pivot points on the first and second sidewalls; a second pair of arms extending transversely from and affixed to a second pair of pivot points on the first and second sidewalls; one or more fixed members; and a pair of parallel bars affixed to the one or more fixed members.

In some embodiments, the invention relates to a bale ejection system disclosed herein, wherein the bale ejection system comprises a fixed member positioned above the bale carrier for feeding or retracting a flexible material attached to a face of the bale carrier most distal to the flexible member. The function of the flexible material is designed to protect the baling belts from outside incursion or disturbance and to prevent the operator or other individuals standing near the rear of the bale system from becoming injured by the bale ejection system while it is in operation. In some embodiments, the flexible member comprises a spring-loaded roller for feeding or retracting the flexible material. In some embodiments, the flexible member is operably coupled to at least one motor for facilitating the feeding or retraction of the flexible material. In some embodiments, the flexible material is affixed to the bale carrier at the pair of bars at a first position distal to the flexible member.

In some embodiments, the invention relates to a baler ejection system with one or more fixed members that comprise at least a first roller; wherein the pair of bars are affixed to each end of the first roller on a set of rotatable axes. In some embodiments, the invention relates to the one or more fixed members that comprise at least a first roller and a second roller; wherein the pair of bars are affixed to each end of the first roller and the second rollers on a set of rotatable axes. In some embodiments, the invention relates to a baler ejection system with one or more fixed members that comprise at least a first roller; wherein the pair of bars are affixed to each end of the first roller on a set of rotatable axes and wherein the pair of bars are oriented in parallel to one another. In some embodiments, the invention relates to the one or more fixed members that comprise at least a first roller and a second roller; wherein the pair of parallel bars extends orthogonally to and are affixed to each end of the first roller and the second rollers on a set of rotatable axes. In some embodiments, the invention relates to a baler ejection system with one or more fixed members that comprise at least a first roller, a second roller, and a third roller; wherein the pair of bars is affixed to each end of the first roller, the second roller, and the third roller on a set of rotatable axes. In some embodiments, the invention relates to a baler ejection system with one or more fixed members that comprise at least a first roller, a second roller, and a third roller; wherein the pair of parallel bars extends orthogonally to and is affixed to each end of the first roller, the second roller, and the third roller on a set of rotatable axes.

In some embodiments, the invention relates to a bale ejection system comprising: a bale chamber comprising a first sidewall and a second sidewall; an outlet at the rear end of the bale chamber; and a bale carrier, the bale carrier movable among a closed position and one or more open positions, comprising: a first pair of arms extending transversely from and affixed to a first pair of pivot points on the first and second sidewalls; a second pair of arms extending in transversely from and affixed to a second pair of pivot points on the first and second sidewalls; one or more fixed members; and a pair of bars affixed to the one or more fixed members; and a one or a plurality of baling belts to convey rotation of a bale in the bale chamber in operable contact to a fourth roller positioned above the bale carrier, wherein the fourth roller imparts tension to the baling belts; wherein the first roller takes up slack in the baling belts when the bale carrier pivots upward at any angle from its closed position and provides slack in the one or plurality of baling belts when the bale carrier pivots downward from an open position; wherein the second roller deflects contact between the one or plurality of baling belts and wherein the third roller conveys tension to the one or plurality of baling belts whereby it positions the one or plurality of baling belts in operable contact with the bale when the bale carrier is in its closed position. In some embodiments, the first pair of arms and/or the second pair of arms is operably coupled to a hydraulic system for facilitating upward movement of the first pair of arms and/or the second pair of arms around the first and second pair of pivot points. In some embodiments, the bale ejection system further comprises a lowermost roller that supports the weight of the bale in the bale chamber and facilitates rotation of the bale. In some embodiments, when the bale carrier is in its fully open position, the lowermost roller is positioned above the any partially or fully formed bale in the bale chamber. In some embodiments, the bale ejection system of the present invention is designed for use in an agricultural harvester, such as a round baler, a waste baler, a cotton harvester, or a combine In some embodiments, the bale ejection system uncovers the outlet at one end of the bale chamber through which the bale becomes ejected from the bale chamber when the bale carrier is raised upward to a partially open or fully open position from its closed position. In some embodiments, the bale ejection system further comprises a plate that defines an outward face of retractable bale carrier. In some embodiments, the plate fully covers the one or plurality of baling belts while the baling belts are in operation.

In some embodiments, the invention relates to a system that comprises a bale carrier, wherein the bale carrier can move from a closed position to a fully open position in about 7 seconds or less. In some embodiments, the invention relates to a system that comprises a bale carrier, wherein the bale carrier can move from a closed position to a fully open position in about 6 seconds or less. In some embodiments, the invention relates to a system that comprises a bale carrier, wherein the bale carrier can move from a closed position to a fully open position in about 5 seconds or less. In some embodiments, the invention relates to a system that comprises a bale carrier, wherein the bale carrier can move from a closed position to a fully open position in about 4 seconds or less. In some embodiments, the invention relates to a system that comprises a bale carrier, wherein the bale carrier can move from a closed position to a fully open position in about 3 seconds or less.

In some embodiments, the invention relates to a baler comprising a bale chamber comprising a first sidewall and a second sidewall; an outlet at the rear of the bale chamber; and a bale carrier, the bale carrier movable among a closed position and one or more open positions, comprising: a first pair of arms extending transversely from and affixed to a first pair of pivot points on the first and second sidewalls; a second pair of arms extending transversely from and affixed to a second pair of pivot points on the first and second sidewalls; one or more fixed members; and a pair of bars affixed to the one or more fixed members, wherein the bale carrier uncovers the outlet at the rear of the bale chamber through which the bale becomes ejected from the bale chamber when the bale carrier is raised upward from its closed position.

In some embodiments, the invention relates to a baler comprising a bale chamber comprising a first sidewall and a second sidewall; an outlet at the rear of the bale chamber; and a bale carrier, the bale carrier movable among a closed position and one or more open positions, comprising: a first pair of arms extending transversely from and affixed to a first pair of pivot points on the first and second sidewalls; a second pair of arms extending transversely from and affixed to a second pair of pivot points on the first and second sidewalls; one or more fixed members; and a pair of bars affixed to the one or more fixed members, wherein the bale carrier uncovers the outlet at the rear of the bale chamber through which the bale becomes ejected from the bale chamber when the bale carrier is raised upward from its closed position; and wherein the bale chamber is defined in a space between the first sidewall, the second sidewall, the bale carrier, and a plurality of rollers positioned between and attached to the first and second sidewalls; wherein the plurality of rollers support one or a plurality of baling belts.

In some embodiments, the invention relates to a baler comprising a bale chamber comprising a first sidewall and a second sidewall; an outlet at the rear of the bale chamber; and a bale carrier, the bale carrier movable among a closed position and one or more open positions, comprising: a first pair of arms extending in parallel transversely from and affixed to a first pair of pivot points on the first and second sidewalls; a second pair of arms extending in parallel transversely from and affixed to a second pair of pivot points on the first and second sidewalls; one or more fixed members; and a pair of parallel bars extending orthogonal to and affixed to the one or more fixed members, wherein the bale carriers uncovers the outlet at the rear of the bale chamber through which the bale becomes ejected from the bale chamber when the bale carrier is raised upward from its closed position.

In some embodiments, the baler further comprises a motor operatively coupled to the first pair of arms and/or the second pair of arms for facilitating the upward or downward movement of the bale carrier.

In some embodiments, the invention relates to the method of manufacturing a bale ejection system disclosed herein comprising: affixing a first pair of arms extending transversely from a first pair of pivot points on a first sidewall and a second sidewall; and affixing a second pair of arms extending in transversely from a second pair of pivot points on a first sidewall and a second sidewall; wherein the first sidewall and second sidewall define the bale chamber. In some embodiments, the invention relates to the method of manufacturing a baler comprising: a bale chamber comprising a first sidewall and a second sidewall; an outlet at the rear of the one or more bale chambers; and a bale carrier, the bale carrier movable among a closed position and one or more open positions, comprising: a first pair of arms extending transversely from and affixed to a first pair of pivot points on the first and second sidewalls; a second pair of arms extending transversely from and affixed to a second pair of pivot points on the first and second sidewalls; one or more fixed members positioned at a distance defined by the length of the first and second pair of arms; and a pair of parallel bars affixed to the one or more fixed members, wherein the bale carrier uncovers the outlet at the rear of the bale chamber through which the bale becomes ejected from the bale chamber when the retractable bale carrier is raised upward from its closed position; said method comprising: affixing a first pair of arms extending transversely from a first pair of pivot points on a first sidewall and a second sidewall; and affixing a second pair of arms extending transversely from a second pair of pivot points on a first sidewall and a second sidewall; wherein the bale chamber is defined in a space between the first sidewall, the second sidewall, the bale carrier, and a plurality of rollers positioned between and attached to the first and second sidewalls; wherein the plurality of rollers support one or more baling belts.

BRIEF DESCRIPTION OF THE DRAWINGS

The foregoing and other aspects of the present invention are best understood from the following detailed description when read in connection with the accompanying drawings. Embodiments of the present invention are illustrated by the drawings, however, it is understood that the invention is not limited to the specific instrumentalities disclosed. Included in the drawings are the following Figures:

FIG. 2A shows a side cross-sectional view of an exemplary bale wrapping and ejection system in the closed position; FIG. 2B shows a side cross-sectional view of an exemplary bale wrapping and ejection system in a fully open position. A safety flap, which is positioned above the bale chamber, partially covers the bale ejection outlet so that the baling belts of the invention are not exposed to the area immediately outside the baler.

FIG. 6 shows an exemplary bale wrapping and ejection system in the open position with a spring-loaded flexible member and a bale-kicking mechanism.

DETAILED DESCRIPTION OF ILLUSTRATIVE EMBODIMENTS

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Furthermore, the various components shown or described herein for any specific application of this invention can be varied and the practice of a specific application of any element may already be widely known or used in the art by persons skilled in the art and each will likewise not therefore be discussed in significant detail.

Agricultural balers, such as round balers, are well known in the agricultural industry, and the instant invention can be used with substantially any of such machines. Reference is made, for example, to U.S. Pat. Nos. 6,877,304; 6,688,092; 6,644,006 and 6,295,797 that illustrate such balers, the disclosures of which is incorporated herein by reference in their entirety. Embodiments of the present invention are particularly well suited, but in no way limited to, use with agricultural balers.

The present invention may also find utility in agricultural harvesters including, for example, a waste baler, a cotton harvester, or a combine.

Figure 1:
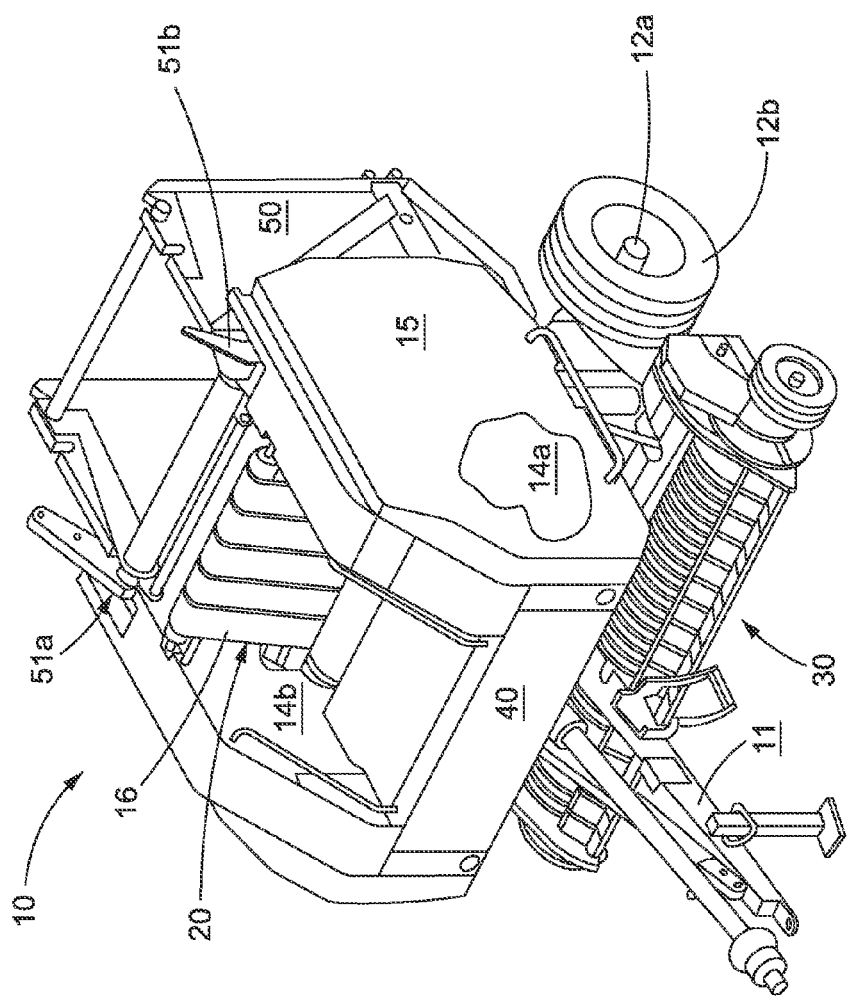
FIG. 1 is a forward and top perspective view of a round baler of the type in which the bale ejection system of the present invention may be integrated.

Referring to FIG. 1, a generally well-known round baler 10 is shown to include a main frame terminating forwardly in a tongue 11 and rearward slightly beyond a transverse axle 12a to which a pair of wheels 12b (only one shown) is mounted, thus forming a wheel supported main frame (not shown in detail). The main frame supports a series of belts 16 and floor rolls (not shown), which together with a first sidewall 14a (shown in the breakout) behind and generally parallel to cover panel 15 and a second sidewall 14b, collectively forming a bale-forming chamber 20. Cut crop material is picked up by transverse pickup 30 and fed into bale-forming chamber 20 where it is formed into a cylindrically shaped ball (not shown) by a series of conveyer belts 16. The bale is then optionally wrapped with twine or a net wrapping material dispensed from a wrapping mechanism generally behind shield 40. Upon completion of the optional wrapping process, the tailgate 50 pivots upwardly about pivot points 51a, 51b and the bale is discharged onto the ground. For clarity and purposes of the instant invention, the tailgate 50 and hydraulic mechanism that controls the upward swing of the tailgate are replaced by the bale carrier comprising the belt mechanism described (depicted in FIG. 2-5) and two hydraulic tensioning actuators on opposite sides of the sidewalls, which, in some embodiments of the present invention, are positioned between the sidewalls and the main frame of the baler.

FIG. 2A depicts an exemplary cross-sectional side view of a bale ejection system in a fully closed position, generally designated 60. Crop in the field is usually arranged in a windrow as it is engaged by the baler being pulled along a windrow of cut crop material by a tractor (not shown). Crop is conveyed into the bale chamber 80 through a crop inlet 91 fed by the transverse pickup 92 and rolled into a cylindrical shape, depicted as cross-section B. In the illustrated embodiment, the bale B may rotate between a first sidewall 85 and second sidewall (not shown) such that the top material moves rearward and downward, with respect to the baler, (counter-clockwise as shown in the figure), in the chamber and the bale chamber rolls 90a, 90b, 90c, and 90d rotate in the opposite direction, here clockwise. The bale ejection system 60 comprises a bale chamber 80, an outlet at the rear end of the bale chamber 75, and a bale carrier that comprises: at least a first pair of arms 61 extending in parallel transversely from and affixed to a first pair of pivot points 61a on the first and second sidewalls (only one arm and one pivot point of the pair is depicted in side view); and a second pair of arms 62 extending in parallel transversely from and affixed to a second pair of pivot points 62a on the first and second sidewalls (only one arm and one pivot point of the pair is depicted in side view). In the depicted embodiment of the invention, the bale carrier also comprises three fixed members 63, 64, 65 around which three elongate rollers 66, 67, and 68 independently rotate around three rotatable axes, the three rollers being affixed to a pair of parallel bars 69 (only one parallel bar is depicted in side view). One or a plurality of baling belts 70 extend downward from a fourth roller 71 positioned above the bale chamber 80. In a fully closed position such as depicted in FIG. 2A, a sufficient amount of tension is created in the baling belts 70, so that the baling belts 70 and bale carrier obstruct the outlet 75. A pair of side frames 72 (only one side frame is depicted in the FIG. 2A and FIG. 2B) encases the sidewalls, bale chamber 80, and bale carrier of the baler and extends rearward past the bale carrier. A stationary bar 73 affixed between the pair of side frames 72 is attached to one edge of a flexible material 74 such as a tarp, textile, rubber or combination thereof, and extends downward from the stationary bar 73 positioned above the bale chamber 80 and the bale carrier. In a fully closed position such as depicted in FIG. 2A, the lowermost roller 66 is in operable contact with a length of one or a plurality baling belts 70 that lie underneath the rolling bale B. The lowermost roller 66 is affixed between the parallel bars 69 (only one depicted) and provides support to the rolling bale B while in operation. The lowermost roller 66 also positions the baling belts around the bale carrier. The second roller 67 affixed between the parallel bars 69 (only one depicted) functions as a tension point in the baling belts 70 during operation in the fully closed position to ensure that slack in the baling belts 70 does not come into contact with the rotating bale B and thereby disrupt bale formation. The uppermost roller 68 is not in contact with the baling belts during operation of the bale chamber in its fully closed position. A thin plate 77 riveted to the pair of parallel bars 69 covers the baling belts to conceal the baling belts during operation and provide a physical barrier between the baling belts and the outside environment. The parallel bars 69 are of a sufficient width so that the thin plate may cover the bale carrier but not obstruct the rotation of the rollers 66, 67, 68.

FIG. 2B depicts a bale ejection system 100 in a fully open position. The fully open position allows exit of the bale B through the outlet 75 when the first pair of arms 61 (only one arm of pair shown) and the second pair of arms 62 (only one arm of pair shown) are raised by activation of hydraulic tensioning actuators (not shown) positioned on opposite sides of the sidewalls. The bars 69 (only one bar shown) that support the fixed members 63, 64, and 65 no longer obstruct the outlet 75 and allow the bale B to evacuate the bale chamber 80 and roll onto the ground over the bale ramp 76. More specifically, the bale B rotates counter-clockwise without support of the lowermost roller 66. The momentum of the bale B in operable contact with the bale chamber rolls 90a, 90b, 90c, and 90d and baling belts 70 enables the bale B to move laterally out of the bale chamber, through the outlet 75, and onto the bale ramp 76. In a raised position, such as the depiction of FIG. 2B, the middle roller 67 acts to deflect the serpentine of baling belts 70 from interrupting the bale B rotation within the bale chamber 80. Similarly, any excess slack in the baling belts 70 created by the difference in position between the bale carrier in its closed and open position can be taken up by the uppermost roller 68 on the bale carrier. It should be noted that, in some embodiments, most excess slack in the system is taken up by the rest of the serpentine system of rollers in the front of the baler (not depicted).

Figure 3A:
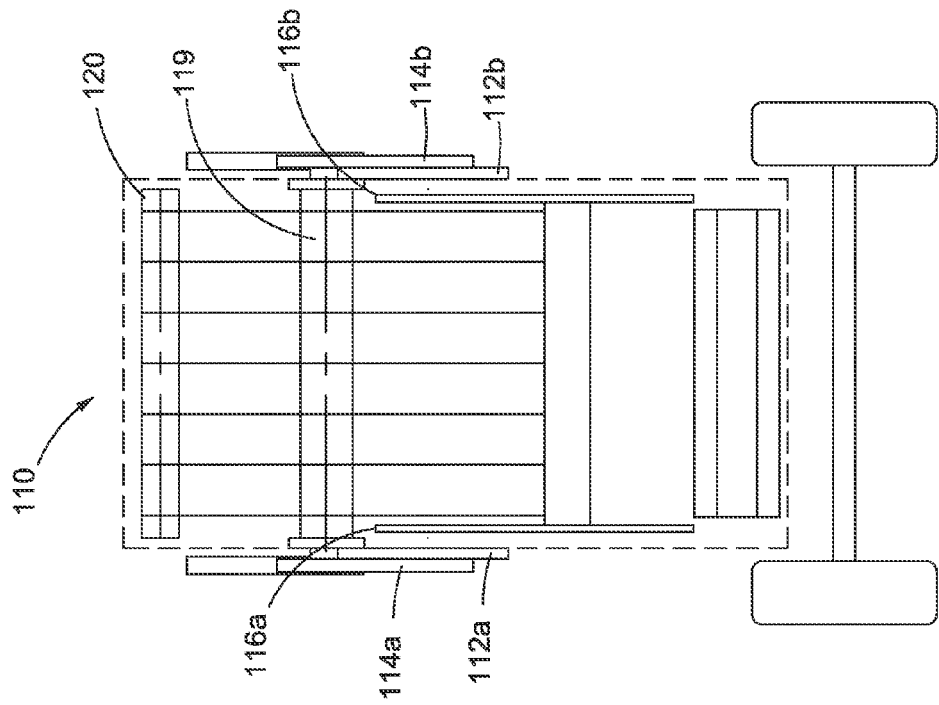
FIG. 3A shows a rear view of an exemplary bale wrapping and ejection system in the closed position.
Figure 3B:
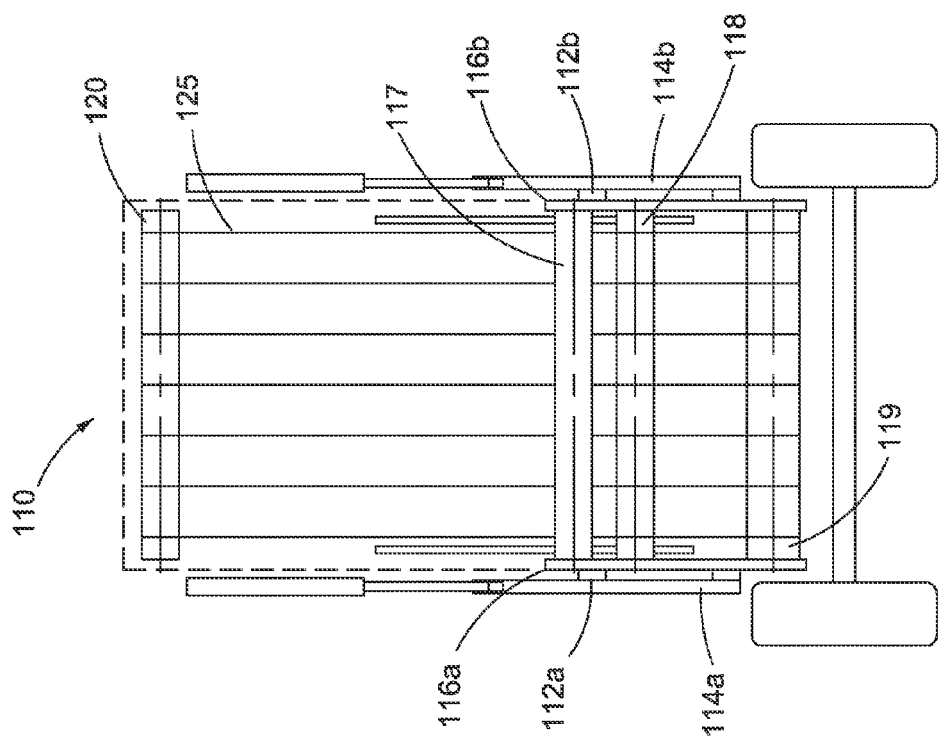
FIG. 3B shows a rear view of an exemplary bale wrapping and ejection system in a fully open position.

FIG. 3 depicts the rear view of the bale carrier 110 in its closed (FIG. 3A) and open positions (FIG. 3B) without the bale side frame encasing the bale carrier 110. A first pair of parallel arms 112a and 112b extend from a first pair of pivot points on the sidewall (not shown) of the baler. The first pair of parallel arms 112a and 112b are affixed to two parallel bars 116a and 116b at a position between the first 117 and second 118 fixed members of the bale carrier. A second pair of parallel arms 114a and 114b extend from a second pair of pivot points (not shown) positioned upward and rearward from the first pair of pivot points. The second pair of parallel arms 114a and 114b are affixed to two parallel bars 116a and 116b between the second 118 and third 119 fixed members of the bale carrier. A fourth fixed member 120 positioned substantially above the first 117, second 118, and third 119 fixed members comprises a roller in operable contact with the baling belts 125. The fourth fixed member 120 is positioned on a plane with the second fixed member 118 such that the baling belts 125 extend past the first fixed member 117 in a fully closed position and is in operable contact with the second 118 and third 119 fixed members. In the open configuration, depicted in FIG. 3B, the length of baling belts 125 between the fourth 120 and first 117 fixed members folds inward such that the first fixed member 117 comprising a roller takes up the slack caused by the loss of tension in the baling belts 125 in the closed position.

Figure 4A:
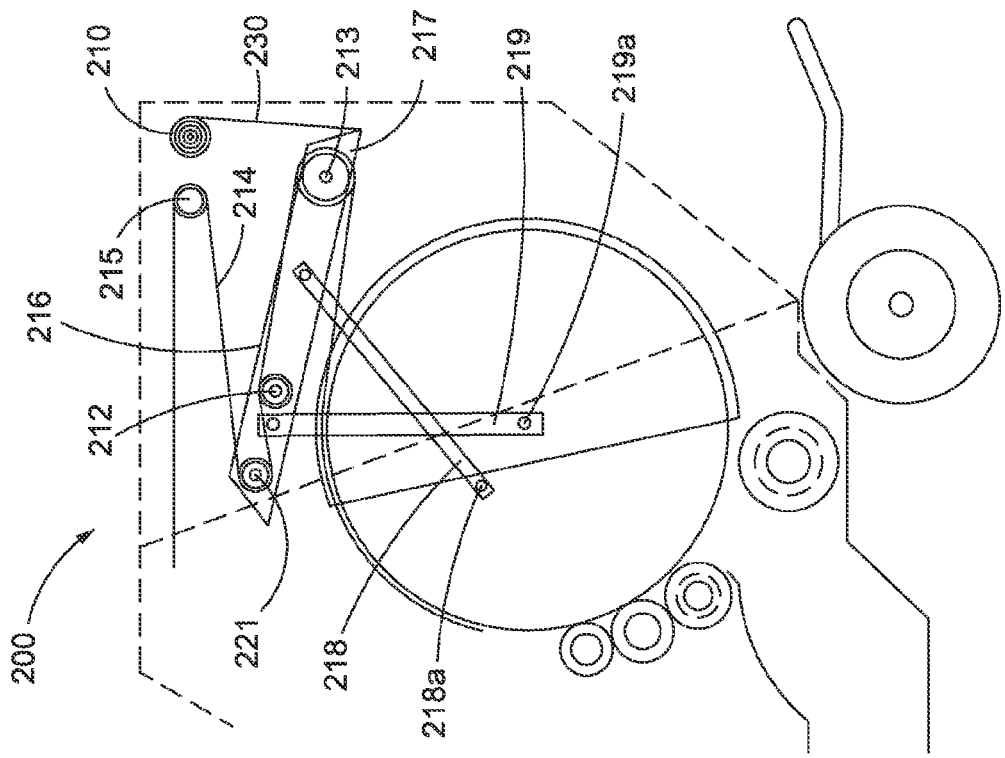
FIG. 4A shows a side cross-sectional view of an exemplary bale wrapping and ejection system in the closed position with a spring-loaded flexible member.

In some embodiments, such as the embodiment depicted in FIG. 4, the bale ejection system comprises a fifth fixed member 210 positioned above the bale carrier and at the same or similar height but rearward of the fourth fixed member 215. The fifth fixed member 210 feeds and retracts a flexible material 230 such as a tarp around the back of the ejection system 200 in a closed position. A thin plate 216 is fastened to the pair of parallel bars 217 and (second bar of pair not shown) so that the plate creates a metal face to the most rearward portion of the bale carrier. The thin plate 216 functions to shield the baling belts from the rear end of the baler. The leading edge of the flexible material 230 is attached to the bottom of the thin plate 216 of the bale carrier proximate to the third fixed member 213. A set of baling belts 214 are in operable contact with the fourth fixed member 215, second fixed member 212, and third fixed member 213 when the bale carrier is in its closed position. The baling belts 214 remain in operable contact with the bale in the bale chamber during operation of the baler.

Figure 4B:
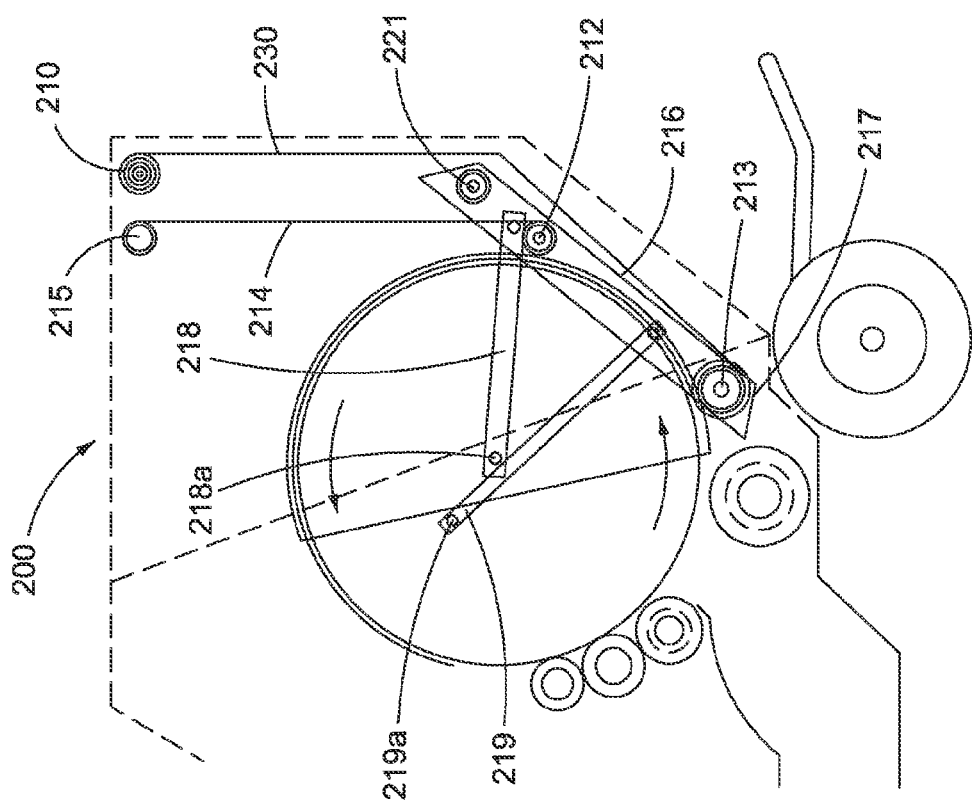
FIG. 4B shows an exemplary bale wrapping and ejection system in the open position with a spring-loaded flexible member.

FIG. 4B shows a fixed bale chamber in the fully open position after hydraulic tensioning actuators (not shown) lift a first 218 and second 219 pair (second companion arm of each pair not depicted) of parallel arms. The fifth fixed member 210 retracts the flexible material 230 upward simultaneously as the first 218 and second 219 pair of parallel arms extending from the sidewall pivot upward at two distinct pivot points 218a and 219a, respectively, when the hydraulic tensioning actuators (not shown) are engaged. For a quick retraction of the bale carrier and flexible material 230, the fifth fixed member 210 comprises a spring loaded mechanism that the operator can activate and deactivate from the operator's position.

Figure 5:
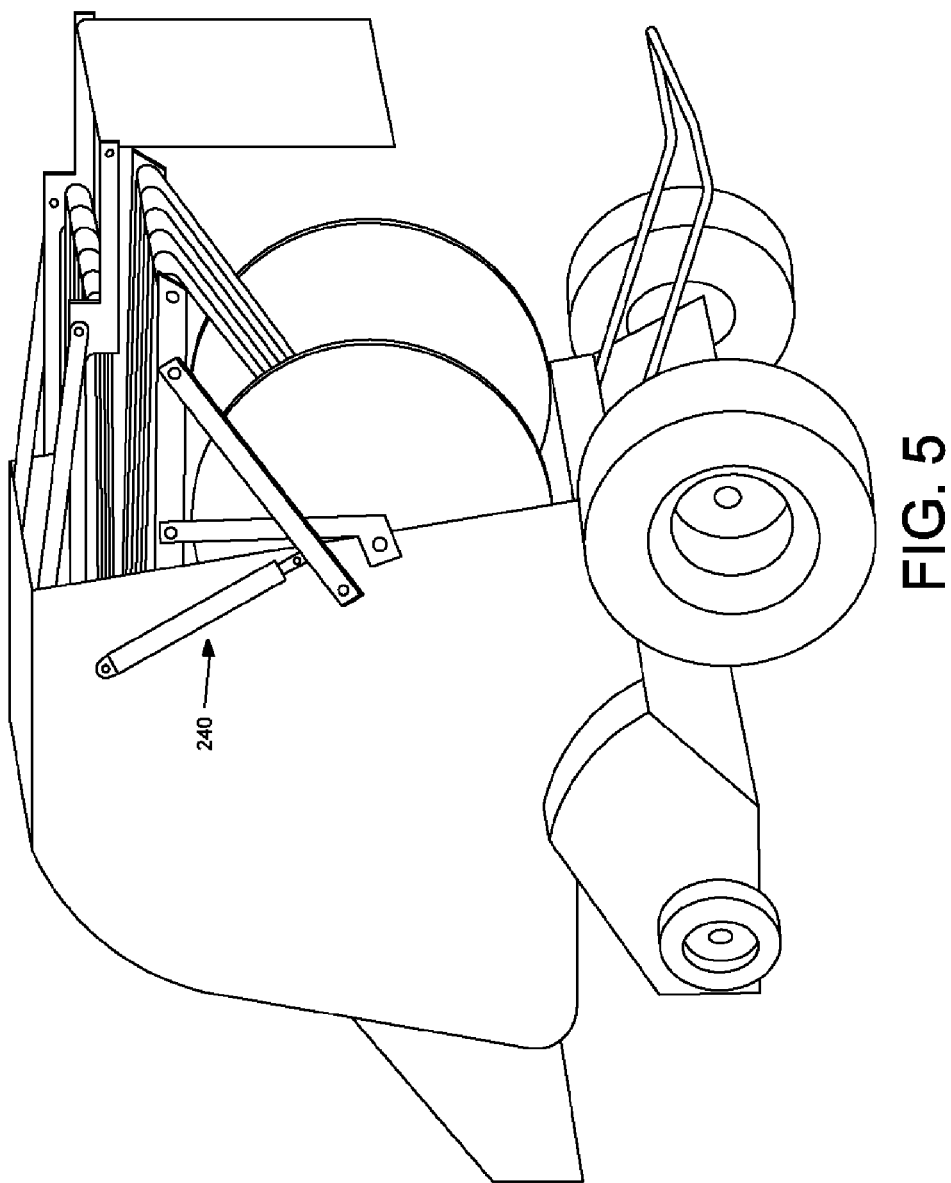
FIG. 5 shows a rear and cross-sectional view of an exemplary baler ejection system in the open position without the side frame of the baler.

FIG. 5. depicts a rear-angled and top perspective view of the baler in an open position without a side frame, but with a flap of flexible material that partially covers the bale carrier outlet. Hydraulic tensioning actuators 240 resting on each sidewall of the baler (only one side shown) are mechanically attached to the outmost set of parallel arms. When fully retracted, the hydraulic tensioning actuators 240 raise the bale carrier above the bale chamber to allow evacuation of the bale from the bale chamber.

FIG. 6 depicts a bale-kicking mechanism integrated within the fixed bale chamber in the fully open position after hydraulic tensioning actuators (not shown) lift a first and second pair (second companion arm of each pair not depicted) of parallel arms above the bale chamber. In an open position, the upper edge of the bale carrier depresses a metal spring 250 that is mechanically attached to a metal linkage 270 by way of a metal sheath 260 and a roller 90d that rests within the bale chamber. A ratcheted hinge on the metal linkage 270 directs lateral movement of the linkage toward the interior of the bale chamber. The roller 90d is movable in the lateral direction and, upon opening the bale carrier, the roller 90d kicks the bale from the bale chamber. Cumulative force from the lateral movement of the roller 90d and the baling belts around the bale allow the bale to evacuate the bale chamber easily while the baler is in operation.

In some embodiments, the bale ejection system comprises at least three, four, or five pairs of pivot points from which arms attached to a sidewall extend transversely to a pair of parallel bars. In some embodiments, the distance between the parallel bars is defined by the length of the at least one, two, or three fixed members affixed to each parallel bar and around which a first, second, and third roller, respectively, spin on their respective rotatable axes. In some embodiments, the first roller is positioned most rearward from the front of the bale ejector and collects slack in the conveyor belt which is in operable contact with the bale when the bale carrier is raised at any angle. In some embodiments, the second roller positioned between the first and third rollers, yet more proximate to the first roller, creates tension in one or a plurality of baling belts and deflects the one or plurality of baling belts away from the bale chamber until the one or more baling belts wrap around the third roller. In some embodiments, the third roller, or lowermost roller, supports some of the bale's weight in the bale chamber while the bale carrier is in its fully closed position. In some embodiments, the third roller also functions to guide the one or plurality of baling belts in the upward direction and around the bale in the bale chamber. In some embodiments, the baler comprises a bale chamber defined by a plurality of fixed rollers positioned frontward to the bale chamber and an outlet of a transverse pickup, wherein at least one of the plurality of fixed rollers is adjacent to the outlet of the transverse pickup. In some embodiments, the plurality of fixed rollers positioned frontward to the bale chamber comprises at least three fixed rollers, wherein at least one of the plurality of fixed rollers positioned frontward to the bale chamber is positioned adjacent to the outlet of the transverse pickup. In some embodiments, the plurality of fixed rollers positioned frontward to the bale chamber comprises at least four fixed rollers, wherein at least one of the plurality of fixed rollers positioned frontward to the bale chamber is positioned adjacent to the outlet of the transverse pickup.

In some embodiments, the bale ejection system comprises one or more hydraulic tensioning actuators that extend to raise at least a first and second pair of arms extending from the sidewalls of the bale chamber to one of multiple positions. In some embodiments, the first and second pair of arms pivot and can remain stationary at any angle above its closed position about a first and a second pair of pivot points. In some embodiments, the bale carrier can be raised by extension of the tension actuators mechanically attached to the first and/or second pair of arms, and the first pair and/or second pair of arms are raised around the first and/or second, respectively, pair of pivot points until the first pair of arms swings upwardly at no more than about 90 degrees from where the arms are positioned in a fully closed position. In some embodiments, the first and second pair of arms pivot and can remain stationary at any angle above its closed position about a first and a second pair of pivot points. In some embodiments, the bale carrier can be raised by extension of the tension actuators mechanically attached to the first and/or second pair of arms, and the first pair and/or second pair of arms are raised around the first and/or second, respectively, pair of pivot points until the first pair of arms swings upwardly at no more than about 60 degrees from where the arms are positioned in a fully closed position. In some embodiments, the first and second pair of arms pivot and can remain stationary at any angle above its closed position about a first and a second pair of pivot points. In some embodiments, the bale carrier can be raised by extension of the tension actuators mechanically attached to the first and/or second pair of arms, and the first pair and/or second pair of arms are raised around the first and/or second, respectively, pair of pivot points until the first pair of arms swings upwardly at no more than about 30 degrees from where the arms are positioned in a fully closed position. In some embodiments, the bale carrier can be raised and stopped around at least a first and a second pair of pivot points by at least a first and second pair of arms extending from each sidewall of the bale chamber at any angle above its closed position. In some embodiments, the bale carrier is raised upward at least a first and a second pair of pivot points by at least a first and second pair of arms extending from each sidewall of the bale chamber until the first pair of arms reaches between about 60 to about 90 degrees from its angle at a closed position.

In some embodiments, the bale carrier is mechanically attached to one or more of the bale chamber rollers positioned in the front of the bale chamber, whereupon raising the bale carrier to any angle above its closed position causes the one or more bale chamber rollers to raise upward and/or rearward to kick out a bale within the bale chamber through the outlet at the rear of the bale chamber. In some embodiments, the bale carrier is mechanically attached to one or more bale chamber rollers attached to one or more of the bale chamber rolls positioned in the front of the bale chamber, wherein an operator of the bale carrier has the option of moving the one or more bale chamber rollers at any vector upward or laterally rearward when the bale carrier is raised to any angle above its closed position. In some embodiments, the agricultural harvester comprises one or more bale chamber rollers, each bale chamber roller moveable upon one or more axes so that, when the bale is evacuated from the bale chamber, the operator has an option to move the bale chamber rollers from a stationary position within the bale chamber to strike a bale within the bale chamber and cause the bale to exit through an outlet at the rear of the bale chamber at an accelerated rate as compared to a rate of speed at which the bale would evacuate the bale chamber without moving the bale chamber roller. In some embodiments the movable chamber roller is spring-loaded and mechanically attached to the bale carrier of the present invention.

In some embodiments, a thin metal plate is attached to the pair of bars to cover the rearward side of the fixed members positioned within the bale carrier and create a rear face to the bale carrier.

In some embodiments, at least one, two, three, or more sensors are positioned within the bale chamber to detect the size of the bale within the bale chamber. In some embodiments, the bale chamber comprises at least one, two, three or more sensors that operably connected to an indicator light visible to the operator of the bale carrier and/or operably connected to a controller on the agricultural harvester within which the bale carrier is positioned. The controller may be engaged by the operator of the agricultural harvester when the agricultural harvester is functioning so that the operator may identify how large or small the bale is at a given time during operation. In some embodiments, the at least one, two, or three sensors within the bale chamber are automatically engaged to sense how large the bale is when the agricultural harvester is functioning. In some embodiments, the at least one, two, or three sensors within the bale chamber are automatically engaged to sense whether the bale chamber is at or near full capacity.

In some embodiments, the invention relates to an agricultural harvester that comprises the bale ejection system described herein. In some embodiments, the agricultural harvester is a machine chosen from: a combine, a round baler, a waste baler, and a cotton harvester.

The following example is provided to describe the invention in greater detail. It is intended to illustrate, not to limit, the invention. Each of the various publications, including patents and published patent applications, that are cited throughout the application are incorporated by reference herein in their entirety.

Example 1

A standard baler was modified by removing the tailgate and associated frame from the rear of the baler hydraulic system as well as the tension system. The bale ejection system comprising a bale carrier operably linked to a hydraulic system mechanically was attached to two pivot points of the sidewall of the baler proximate to the midline of each side of the baler. The baler was towed to an open field containing lines of windrows and driven across the field at approximately 10 km/hour.

Crop material was collected in the bale chamber until a bale with the desired diameter was formed within the chamber. The hydraulic system attached to the bale carrier was then engaged lifting the two arms of the bale carrier to its fully open position. After engaging the hydraulic system, ejection of the bale was accomplished more quickly than ejection of the bale on a standard baler.

Although the invention has been described with reference to exemplary embodiments, it is not limited thereto. For example, it is foreseeable that the bale carrier of the present invention could be used in modified round balers. Those skilled in the art will appreciate that numerous changes and modifications may be made to the disclosed embodiments of the invention and that such changes and modifications may be made without departing from the true spirit of the invention. It is therefore intended that the appended claims cover be construed to all such equivalent variations as fall within the true spirit and scope of the invention.

What is claimed is:

1. A baler comprising:
 a bale chamber comprising a first sidewall and a second sidewall;
 an outlet at the rear of the bale chamber; and
 a bale carrier, the bale carrier movable among a closed position and one or more open positions, comprising:
  a first pair of arms extending transversely from and affixed to a first pair of pivot points on the first and second sidewalls;
  a second pair of arms extending transversely from and affixed to a second pair of pivot points offset vertically from the corresponding first set of pivot points;
  one or more fixed members positioned at a distance defined by the length of the first and second pair of arms; and
 a pair of parallel bars affixed to the one or more fixed members;
 wherein the bale carrier uncovers the outlet at the rear of the bale chamber through which the bale becomes ejected from the bale chamber when the bale carrier is raised upward into a partially open or fully open position from its closed position; and
 wherein the first and second pair of arms are pivotally connected to the pair of bars such that the pair of bars rotates with respect to at least one of the first and second pair of arms as the carrier rotates between the fully open and fully closed positions.

2. The baler of claim 1, wherein the bale chamber is defined in a space between the first sidewall, the second sidewall, the bale carrier, and a plurality of rollers positioned between and attached to the first and second sidewalls; wherein the plurality of rollers support one or more baling belts.

3. The baler of claim 1, wherein the baler further comprises at least one tensioning actuator operatively coupled to the first pair of arms and/or the second pair of arms for facilitating the upward or downward movement of the bale carrier.

4. A bale ejection system for use in an agricultural harvester comprising:
- a bale chamber comprising a first sidewall and a second sidewall;
- an outlet at the rear of the bale chamber; and
- a bale carrier, the bale carrier movable among a closed position and one or more open positions, comprising:
  - a first pair of arms extending transversely from and affixed to a first pair of pivot points on the first and second sidewalls having a first axis of rotation;
  - a second pair of arms extending transversely from and affixed to a second pair of pivot points on the first and second sidewalls having a second axis of rotation offset vertically from the first axis of rotation;
  - one or more fixed members positioned at a distance defined by the length of the first and second pair of arms; and
  - a pair of parallel bars affixed to the one or more fixed members;
- wherein the first and second pair of arms are pivotally connected to the pair of parallel bars such that the pair of bars rotates with respect to at least one of the pair of arms as the carrier rotates between the open and closed positions.

5. The bale ejection system of claim 4, wherein the bale ejection system further comprises a fixed member positioned above the retractable bale carrier for feeding or retracting a flexible material attached along a face of the retractable bale carrier distal to the flexible member.

6. A bale ejection system for use in an agricultural harvester comprising:
- a bale chamber comprising a first sidewall and a second sidewall;
- an outlet at the rear of the bale chamber; and
- a bale carrier, the bale carrier movable among a closed position and one or more open positions, comprising:
  - a first pair of arms extending transversely from and affixed to a first pair of pivot points on the first and second sidewalls;
  - a second pair of arms extending transversely from and affixed to a second pair of pivot points on the first and second sidewalls;
  - one or more fixed members positioned at a distance defined by the length of the first and second pair of arms; and
  - a pair of parallel bars affixed to the one or more fixed members; and
- a fixed member positioned above the retractable bale carrier for feeding or retracting a flexible material attached along a face of the retractable bale carrier distal to the fixed member;
- wherein the fixed member positioned above the retractable bale carrier comprises a spring-loaded roller for feeding or retracting the flexible material.

7. The bale ejection system of claim 5, wherein the fixed member positioned above the retractable bale carrier is operably coupled to at least one motor for facilitating the feeding or retraction of the flexible material.

8. The bale ejection system of claim 4, wherein the agricultural harvester is a round baler, cotton harvester, waste baler, or combine.

9. The bale ejection system of claim 4, wherein the one or more fixed members comprise
- at least a first roller; wherein the pair of parallel bars are affixed to each end of the first roller on a set of rotatable axes.

10. The bale ejection system of claim 4, wherein the one or more fixed members comprise
- at least a first roller and a second roller; wherein the pair of parallel bars are affixed to each end of the first roller and the second rollers on a set of rotatable axes.

11. The bale ejection system of claim 4, wherein the first pair of arms and/or the second pair of arms is operably coupled to a hydraulic system for facilitating upward movement of the first pair of arms and/or the second pair of arms around the first and second pair of pivot points.

12. The bale ejection system of claim 4, wherein the one or more fixed members comprise at
- least a first roller, a second roller, and a third roller; wherein the pair of parallel bars is affixed to each end of the first roller, the second roller, and the third roller on a set of rotatable axes.

13. The bale ejection system of claim 12, wherein the bale ejection system further comprises:
- one or more baling belts to convey rotation of a bale in the bale chamber in contact with a fourth roller positioned above the retractable bale carrier that imparts tension to the one or more baling belts;
- wherein the first roller takes up slack in the one or more baling belts when the retractable bale carrier pivots upward at any angle from its closed position and provides slack in the one or more baling belts when the retractable bale carrier pivots downward from an open position;
- wherein the second roller deflects contact between the bale and the one or more baling belts; and
- wherein the third roller conveys tension to the one or more baling belts whereby it positions the one or more baling belts in operable contact with the bale when the retractable bale carrier is in its closed position.

14. The bale ejection system of claim 12, wherein the third roller supports the weight of the bale in the bale chamber and facilitates rotation of the bale.

15. The bale ejection system of claim 4, wherein the bale ejection system uncovers the outlet at one end of the bale chamber through which the bale becomes ejected from the bale chamber when the bale carrier is raised upward from its closed position.

16. The bale ejection system of claim 4, wherein the bale carrier further comprises a plate that defines an outward face of the bale carrier.

17. The bale ejection system of claim 4, wherein bale carrier can move from a closed position to a fully open position in about 5 seconds or less.

18. The bale ejection system of claim 4, wherein the first pair of arms and the second pair of arms are different lengths.

* * * * *